US012589819B2

(12) United States Patent
Alamdar et al.

(10) Patent No.: US 12,589,819 B2
(45) Date of Patent: Mar. 31, 2026

(54) SISSY BAR DEVICE WITH FOLDABLE LUGGAGE RACK

(71) Applicants: Husnain A. Alamdar, Yorba Linda, CA (US); Ammar Arif, Montclair, CA (US)

(72) Inventors: Husnain A. Alamdar, Yorba Linda, CA (US); Ammar Arif, Montclair, CA (US)

( * ) Notice: Subject to any disclaimer, the term of this patent is extended or adjusted under 35 U.S.C. 154(b) by 28 days.

(21) Appl. No.: 18/777,111

(22) Filed: Jul. 18, 2024

(65) Prior Publication Data

US 2026/0021855 A1      Jan. 22, 2026

(51) Int. Cl.
*B62J 7/04* (2006.01)
*B62J 1/28* (2006.01)

(52) U.S. Cl.
CPC ... *B62J 7/04* (2013.01); *B62J 1/28* (2013.01)

(58) Field of Classification Search
CPC ..................................... B62J 1/28; B62J 7/04
See application file for complete search history.

(56) References Cited

U.S. PATENT DOCUMENTS

| | | | |
|---|---|---|---|
| 3,901,534 A | 8/1975 | Popken | |
| D332,540 S * | 1/1993 | Peterson | D12/407 |
| 6,568,699 B2 | 5/2003 | McCann | |
| 6,659,547 B2 | 12/2003 | Petersen | |
| 6,966,471 B1 | 11/2005 | Wilson et al. | |
| 8,459,517 B2 * | 6/2013 | Lindloff | B62J 1/28 |
| | | | 224/450 |
| D1,047,778 S * | 10/2024 | Arif | D12/119 |
| D1,063,718 S * | 2/2025 | Zhang | D12/114 |
| 2003/0025290 A1 | 2/2003 | McCann | |

* cited by examiner

*Primary Examiner* — Justin M Larson

(57) ABSTRACT

The sissy bar device is intended to provide users with a sissy bar that can be used with and without a luggage rack. In other words, the luggage rack sits flush within the sissy bar when not in use but may be deployed to 90 degrees away from the sissy bar, when a luggage holding platform is required. More specifically, the luggage rack is deployable and retractable. To accomplish this, the device includes a luggage rack that is hingedly coupled within a sissy bar. The device further comprises a base rack for support and support brackets that prevent the luggage rack from bending below a certain angle. The luggage rack may be locked and unlocked into desired configurations with the help of a locking knob. Thus, the sissy bar device with foldable luggage rack is a simple and versatile device that can be very useful for motorcycle users.

20 Claims, 11 Drawing Sheets

SISSY BAR DEVICE WITH FOLDABLE LUGGAGE RACK

FIELD OF THE INVENTION

The present invention generally relates to a sissy bar device. More specifically, the present invention is a sissy bar with a foldable luggage rack integrated with it.

BACKGROUND OF THE INVENTION

A sissy bar, also called a "sister bar" or "passenger backrest", is an addition to the rear of a bicycle or motorcycle that allows the rider or passenger to recline against it while riding. More specifically, the sissy bar enables a passenger to recline as they ride for enhanced comfort and back support. A motorcycle sissy bar typically connects to the back fender struts. A motorcycle luggage rack is a metal frame that provides space to secure extra luggage. This aftermarket part comes in handy when going on a camping trip or a long ride. They are usually made of lightweight metal to ensure your motorcycle is not weighed down. Different kinds of sissy bars and luggage racks are available in the market. However, a sissy bar with a deployable luggage rack is a rare find in the current market.

It is an objective of the present invention to provide users with a sissy bar that can be used with and without luggage rack. In other words, the present invention is a sissy bar device with an optional luggage rack. The luggage rack sits flush within the sissy bar when not in use but may be deployed to 90 degrees away from the sissy bar, when a luggage holding platform is needed. The luggage rack may be locked and unlocked into desired configurations with the help of a locking knob. Thus, the present invention is a simple and versatile device that can come to be very useful for motorcycle users.

SUMMARY

The present invention is intended to provide users with a sissy bar that can be used with and without a luggage rack. In other words, the present invention is a sissy bar device with an optional luggage rack. The luggage rack sits flush within the sissy bar when not in use but may be deployed to 90 degrees away from the sissy bar, when a luggage holding platform is required. More specifically, the luggage rack is deployable and retractable. To accomplish this, the present invention comprises a luggage rack that is hingedly coupled within a sissy bar. The device further comprises a base rack for support and support brackets that prevent the luggage rack from bending below a certain angle. The luggage rack may be locked and unlocked into desired configurations with the help of a locking knob. Thus, the present invention is a simple and versatile device that can be very useful for motorcycle users.

DETAIL DESCRIPTIONS OF THE INVENTION

All illustrations of the drawings are for the purpose of describing selected versions of the present invention and are not intended to limit the scope of the present invention.

Figure 1:
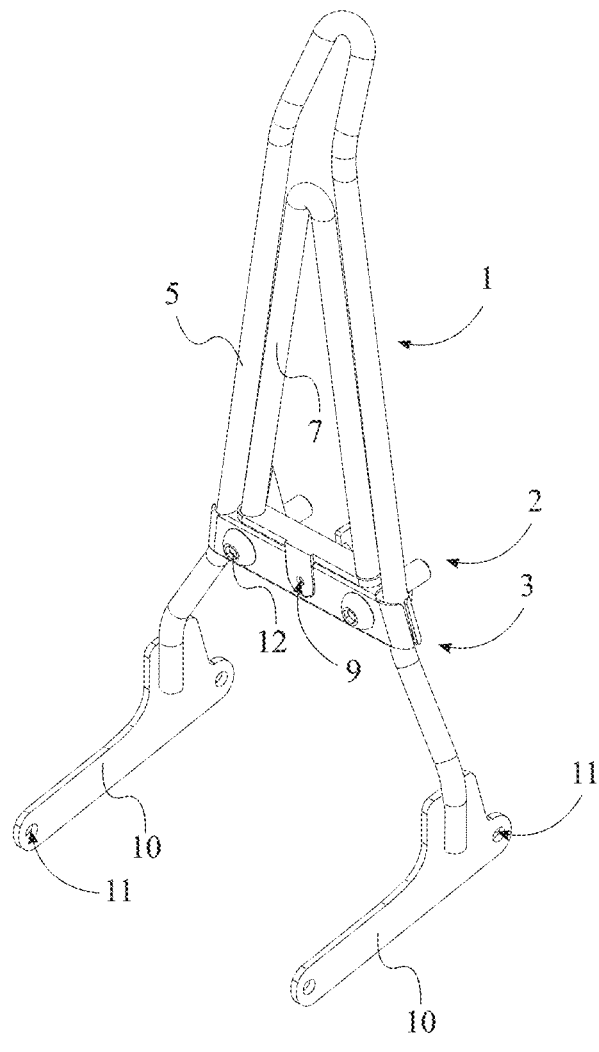
FIG. 1 is a top-front-left perspective view of the present invention, wherein the luggage rack is in a retracted mode.
Figure 2:
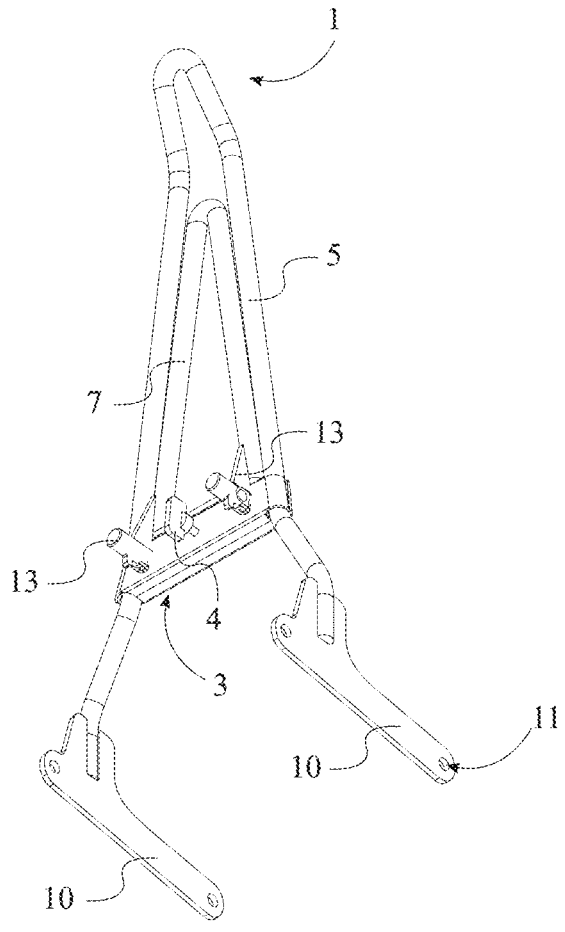
FIG. 2 is an exploded top-rear-left perspective view of the present invention.
Figure 3:
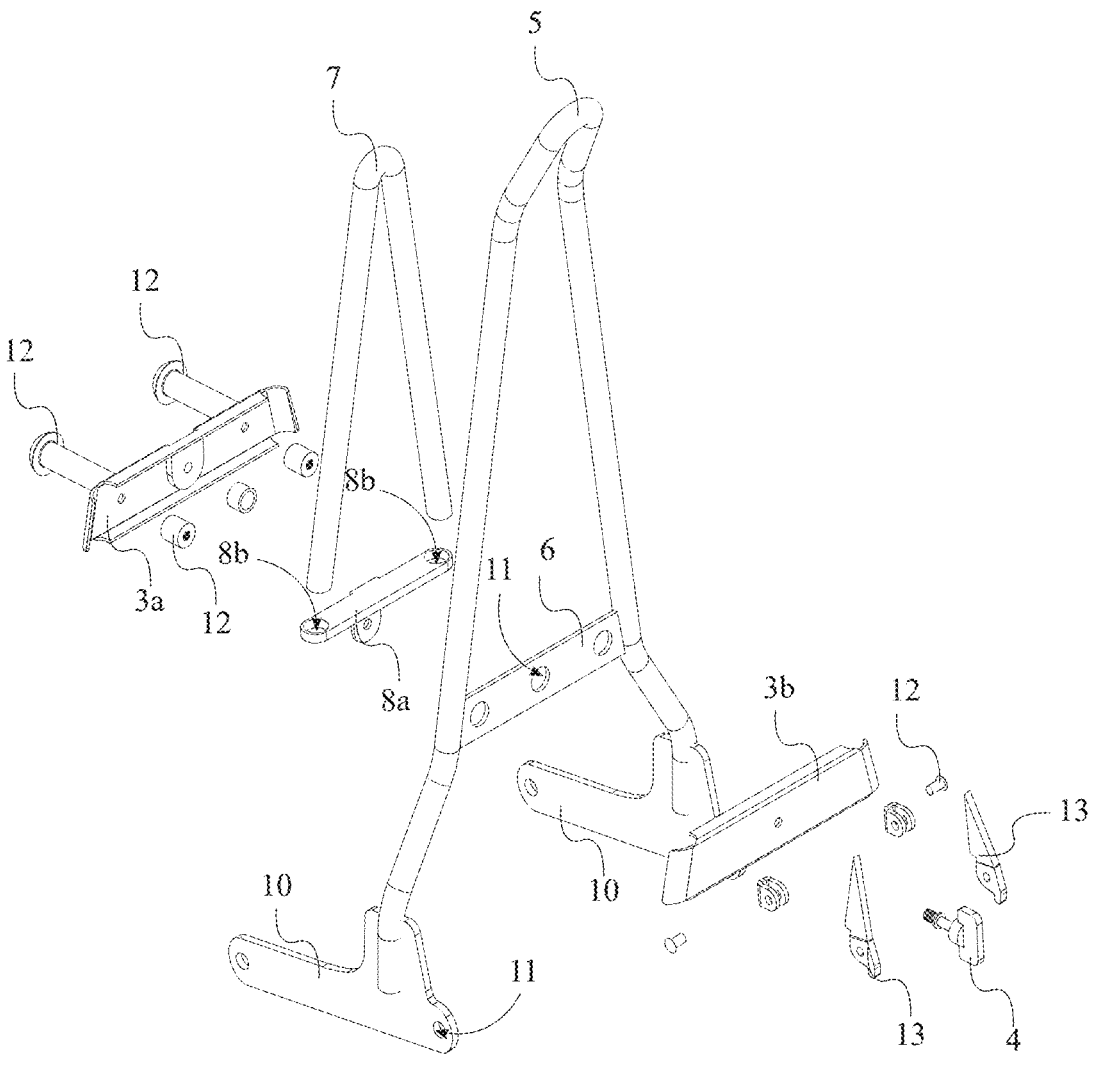
FIG. 3 is a bottom-rear right perspective view of the present invention.
Figure 4:
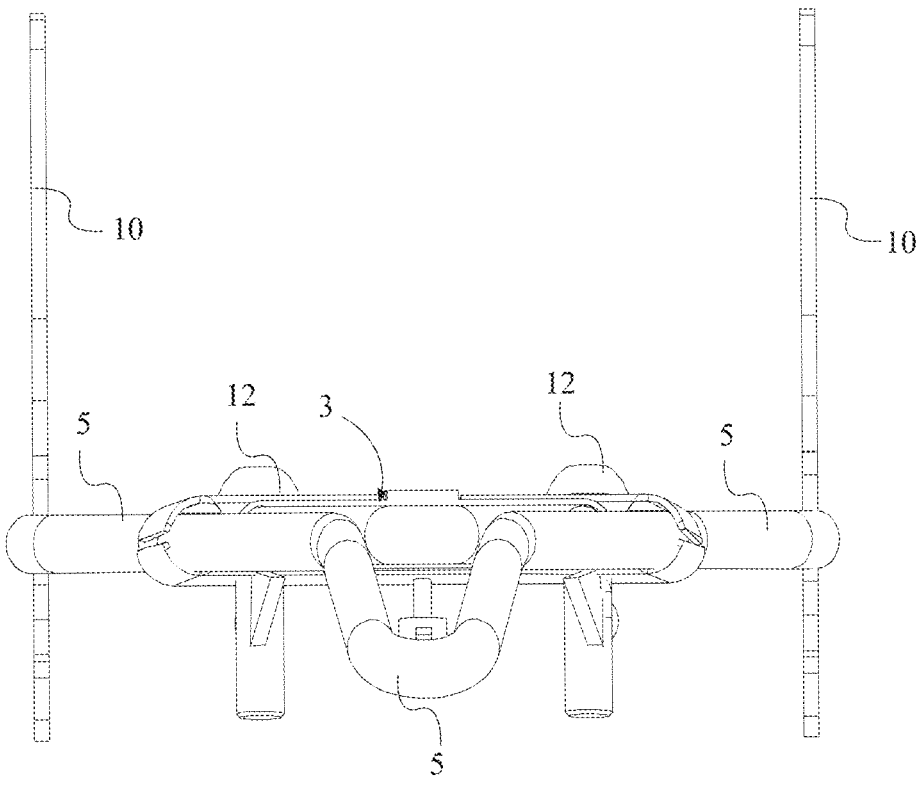
FIG. 4 is a top plan view of the present invention.
Figure 5:
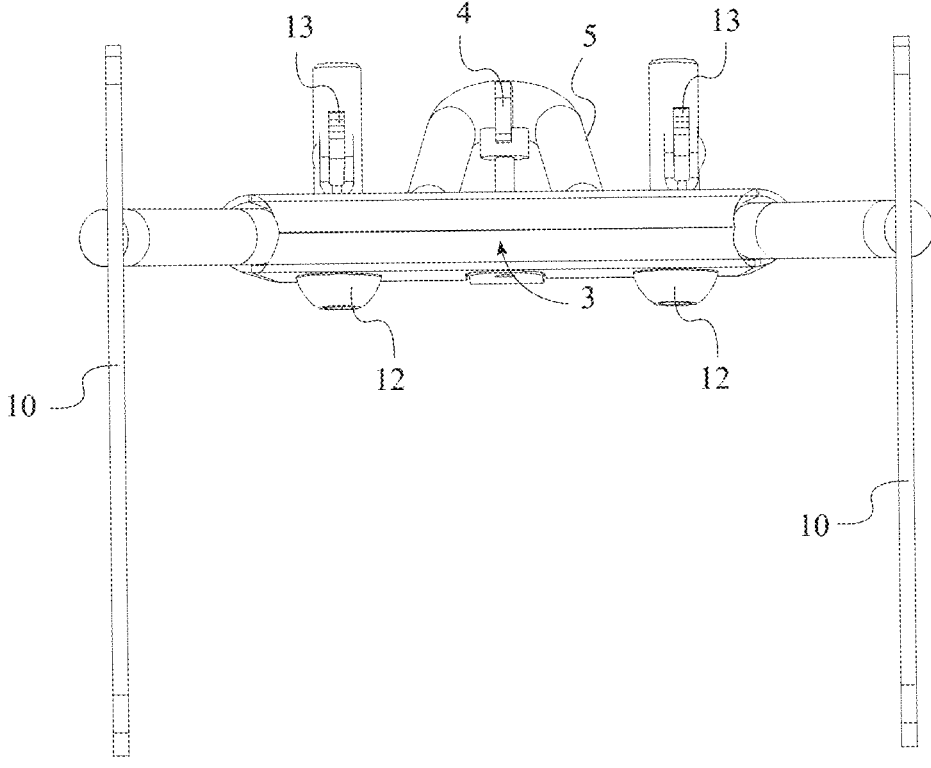
FIG. 5 is a bottom plan view of the present invention.
Figure 6:
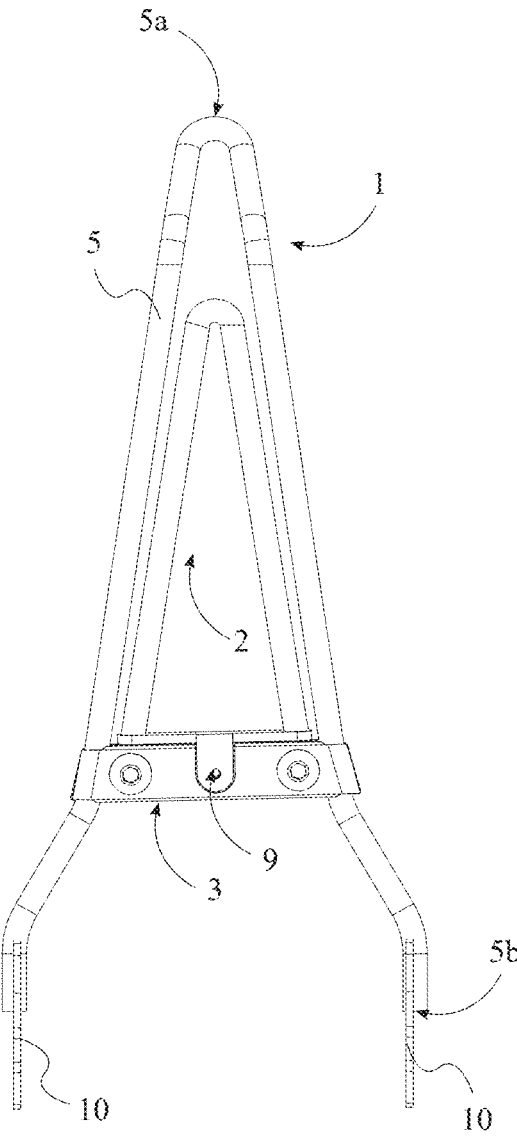
FIG. 6 is a left-side elevational view of the present invention.
Figure 7:
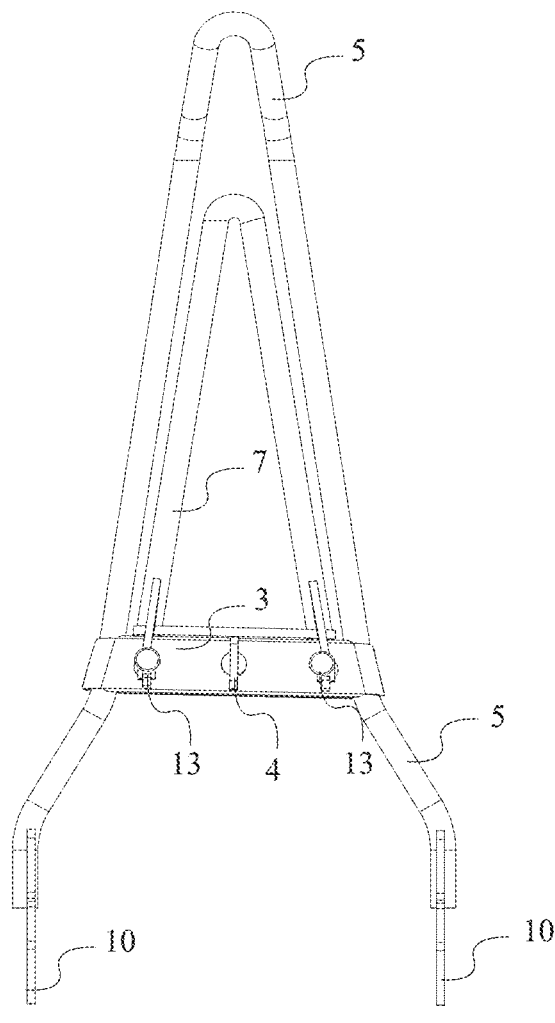
FIG. 7 is a front elevational view of the present invention.
Figure 8:
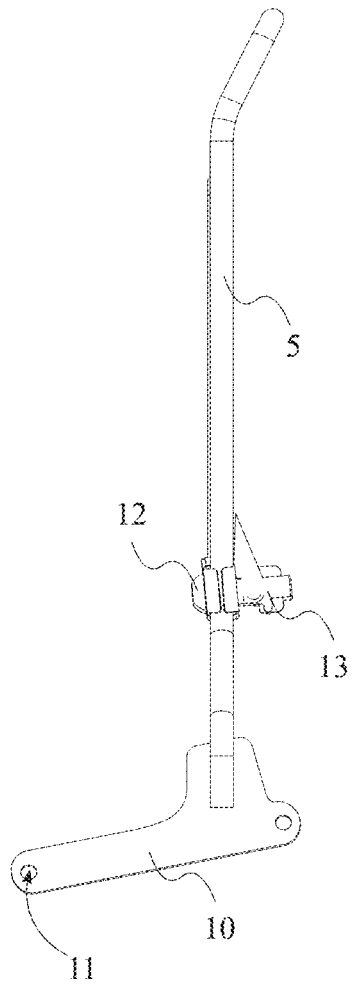
FIG. 8 is a rear elevational view of the present invention.

In reference to FIG. 1 through FIG. 11, the present invention is foldable sissy bar device with a luggage rack. The following description is in reference to FIG. 1 through FIG. 11. According to a preferred embodiment, the present invention comprises a sissy bar 1, a luggage rack 2, a base rack 3, and a locking knob 4. Preferably, the sissy bar 1 is made of a metal such as stainless steel. However, the sissy bar 1 may comprise any other material that is known to one of ordinary skill in the art, as long as the intents of the present invention are not altered. As seen in FIG. 1 through FIG. 3, the sissy bar 1 comprises a main frame 5 and an anti-slip support 6. Further, the main frame 5 comprises a first end 5a and a second end 5b, wherein the first end 5a is positioned opposite to the second end 5b across the main frame 5. Preferably, the first end 5a constitutes a top end of the main frame 5 and the second end 5b constitutes a bottom end of the main frame 5. In the preferred embodiment, the main frame 5 tapers as it extends from the second end 5b towards the first end 5a. In other words, the main frame 5 has an A-shaped transverse cross section and the main frame 5 is made in a tubular design such that the sissy bar 1 provides a comfortable back rest for the passenger using the sissy bar 1.

In reference to FIG. 3, the anti-slip support 6 is welded between two legs of the main frame 5 to prevent the base rack 3 from slippage. The anti-slip support 6 helps keep the shape of the sissy bar device and doesn't allow bending of the main frame 5 due to external pressures and/or heat. To that end, the anti-slip support 6 is mounted within the main frame 5 adjacent to the second end 5b.

It is an aim of the present invention to provide a foldable luggage rack that may be used as needed. As seen in FIG. 1 through FIG. 3 and FIG. 7 and FIG. 8, the luggage rack 2 is mounted within the sissy bar 1. Thus, when the luggage rack 2 is not in use, the shape of the luggage rack 2 matches with that of the main frame 5 and the luggage rack 2 sits within the main frame 5 like an extension of the sissy bar 1. However, when needed, the luggage rack 2 may be easily deployed. To accomplish this, the luggage rack 2 is hingedly coupled to the sissy bar 1. Preferably, the luggage rack 2 is made of the same material as that of the sissy bar 1. In the preferred embodiment, the luggage rack 2 comprises a luggage frame 7, a base piece 8a and a plurality of holes 8b, wherein the plurality of holes 8b traverses through the base piece 8a. Further, terminal edges of the luggage frame 7 are mounted within the plurality of holes 8b. Thus, the luggage frame 7 is mounted onto the base piece 8a and the luggage frame 7 has a shape similar to that of the main frame 5. This is so that there is aesthetic appeal when the luggage rack 2 is not being used and the luggage frame 7 is mounted within the main frame 5 in a flush manner.

Figure 11:
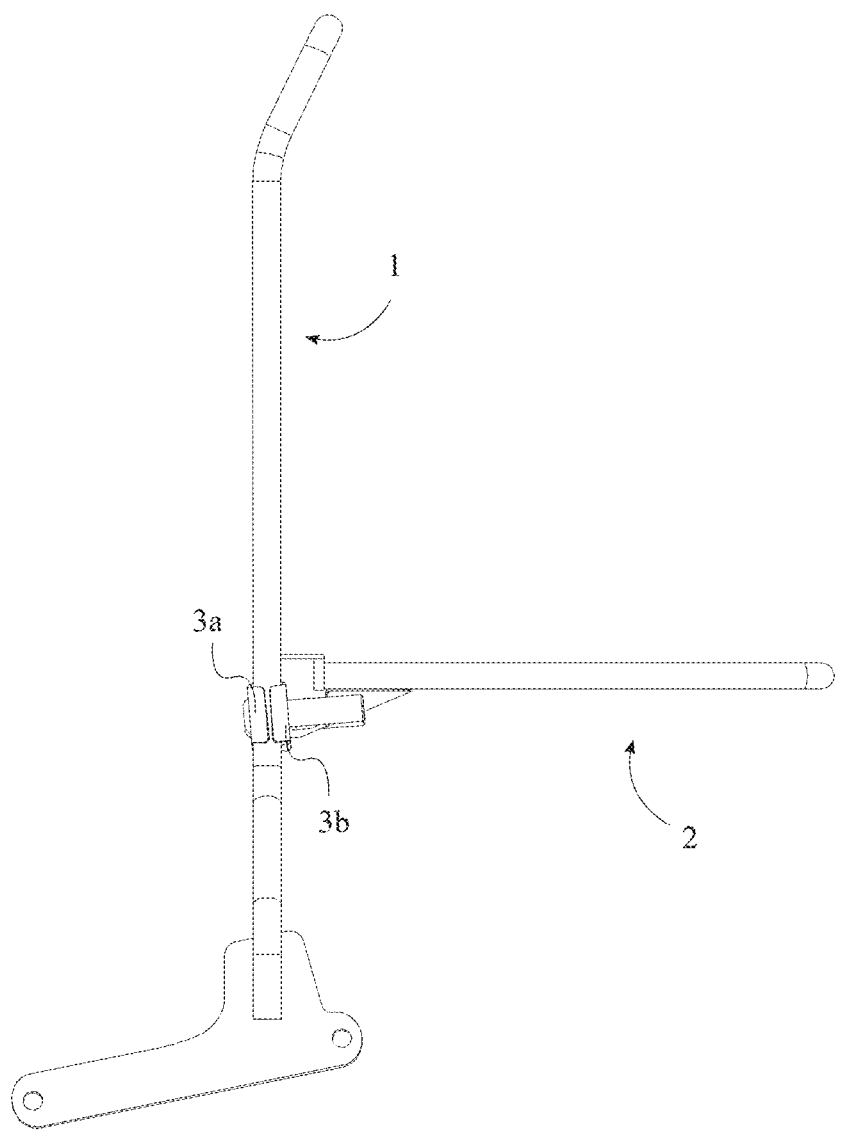
FIG. 11 is a left-side elevational view of the present invention.

As seen in FIG. 1 through FIG. 3, the base rack 3 is mounted around the main frame 5, encapsulating the anti-slip support 6. The base rack 3 forms the main support piece of both the sissy bar 1 and the luggage rack 2. To that end, the base rack 2 is positioned adjacent to the second end 5b of the main frame 5, and the base piece 8a is mounted onto the base rack 3. In order to enable the optional usage of the luggage rack 2, the locking knob 4 is provided. The locking knob 4 is operably integrated between the base rack 3 and the luggage rack 2, wherein operating the locking knob 4 governs switching of the luggage rack 2 between a deployed configuration and a retracted configuration. To that end, the locking knob 4 is centrally mounted across the base rack 3. In other words, the locking knob 4 is attached and tightened to the base rack 3 to make sure that the luggage rack 2 is in a vertical lock position when not in use. Whenever a rider wants to use the luggage rack 2, he will rotate the locking knob 4 to unscrew it from the base rack 3, thus moving the luggage frame 7 to a horizontal or deployed position as seen in FIG. 9, FIG. 11 and FIG. 12.

A more detailed description of the present invention follows.

Figure 9:
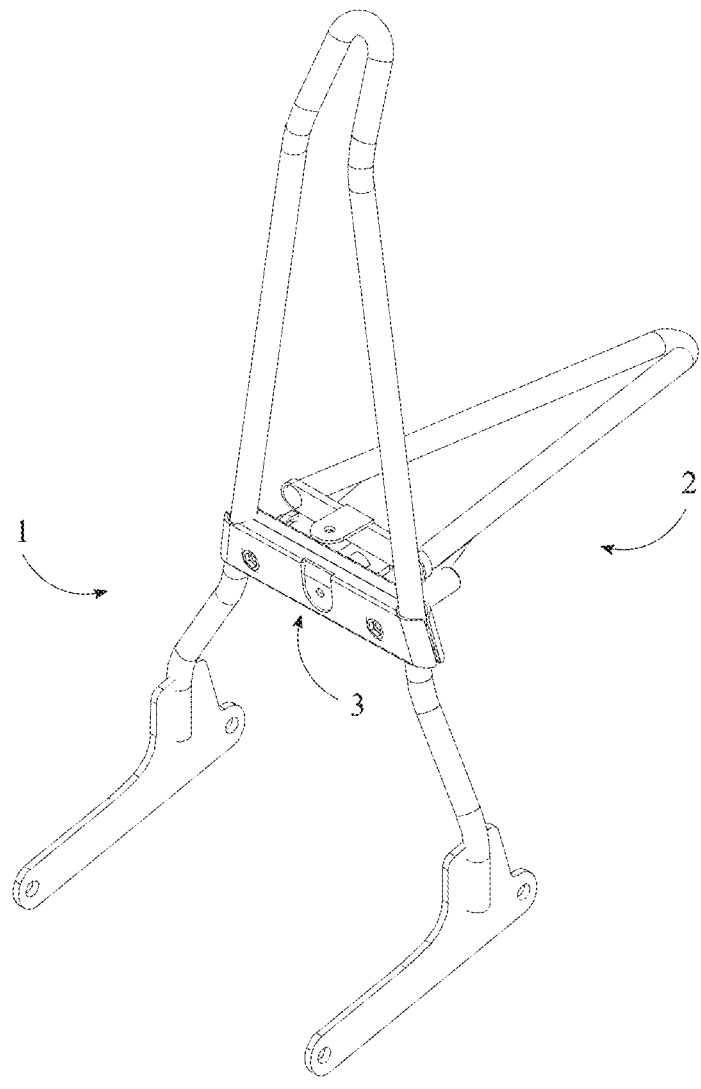
FIG. 9 is a top-front-left perspective view of the present invention, wherein the luggage rack is in a deployed mode.

According to the preferred embodiment, the base piece 8 comprises a locking port 9, as seen in FIG. 9. Preferably, the locking knob 4 is operably coupled with the locking port 9, wherein positioning of the locking knob 4 within the locking port 9 governs locked and unlocked positions of the luggage rack 2. More specifically, when the luggage rack 2 is in a locked position, the locking knob 4 is threaded through the locking port 9 on the base piece 8. Further, when the luggage rack 2 is in an unlocked position or deployed position, the locking port 9 is open and the locking knob 4 is detached from the locking knob 4 as seen in FIG. 9. Preferably, the locking port 9 is a hole in an extended portion of the base rack 3. However, the locking knob 4 and the locking port 9 may comprise any other shape, size, technology, etc. that are known to one of ordinary skill in the art, as long as the intents of the present invention are not altered.

Continuing with the preferred embodiment, the sissy bar 1 comprises a plurality of mounting brackets 10. The plurality of mounting brackets 10 is provided to help mount the sissy bar 1 to the back fenders of a motorbike. As seen in FIG. 1 and FIG. 2, the plurality of mounting brackets 10 extends from terminal ends of the main frame 5. In order to help with the mounting of the sissy bar 1 to a motorbike and the luggage rack 2 to the sissy bar 1, the present invention comprises a plurality of apertures 11 and a plurality of fasteners 12. Preferably, the plurality of apertures 11 traverses the sissy bar 1 and the base rack 3. Further, the plurality of fasteners 12 is integrated with the plurality of apertures 11. More specifically, the plurality of apertures 11 traverses the anti-slip support 6 and the plurality of mounting brackets 10. Fasteners threaded through the plurality of apertures 11 on the plurality of mounting brackets 10 secure the sissy bar 1 to the motorbike, and fasteners threaded through the plurality of apertures 11 on the base rack 3 and the anti-slip support 6 secure the luggage rack 2 to the sissy bar 1. As seen in FIG. 1 through FIG. 3, the plurality of fasteners 12 comprises nuts and bolts. However, the plurality of fasteners 12 and the plurality of apertures 11 may comprise any number, size, shape, technology, etc. that are known to one of ordinary skill in the art, as long as the intents of the present invention are not altered.

As seen in FIG. 3, the base rack 3 comprises a first piece 3a and a second piece 3b. Preferably, the first piece 3a is connected to the second piece 3b about the anti-slip support 6 and the main frame 5, wherein the first piece 3a is oriented towards the second piece 3b. More specifically, the first piece 3a and the second piece 3b protectively covers the anti-slip support 6 and together they form the base structure that connects and carries the luggage rack 2 with the sissy bar 1.

In the preferred embodiment, the luggage rack 2 has two welded clamps attached to its base through a hinge. Accordingly, the present invention comprises a plurality of rack clamps 13, wherein the plurality of rack clamps 13 is mounted onto terminal ends of the luggage frame 7. Further, the plurality of rack clamps 13 is operably coupled to the base rack 3, wherein the plurality of rack clamps 13 prevents movement of the luggage rack 2 beyond an angle during the deployed configuration. In other words, the plurality of rack clamps 13 is hingedly coupled to the base rack 3.

Figure 10:
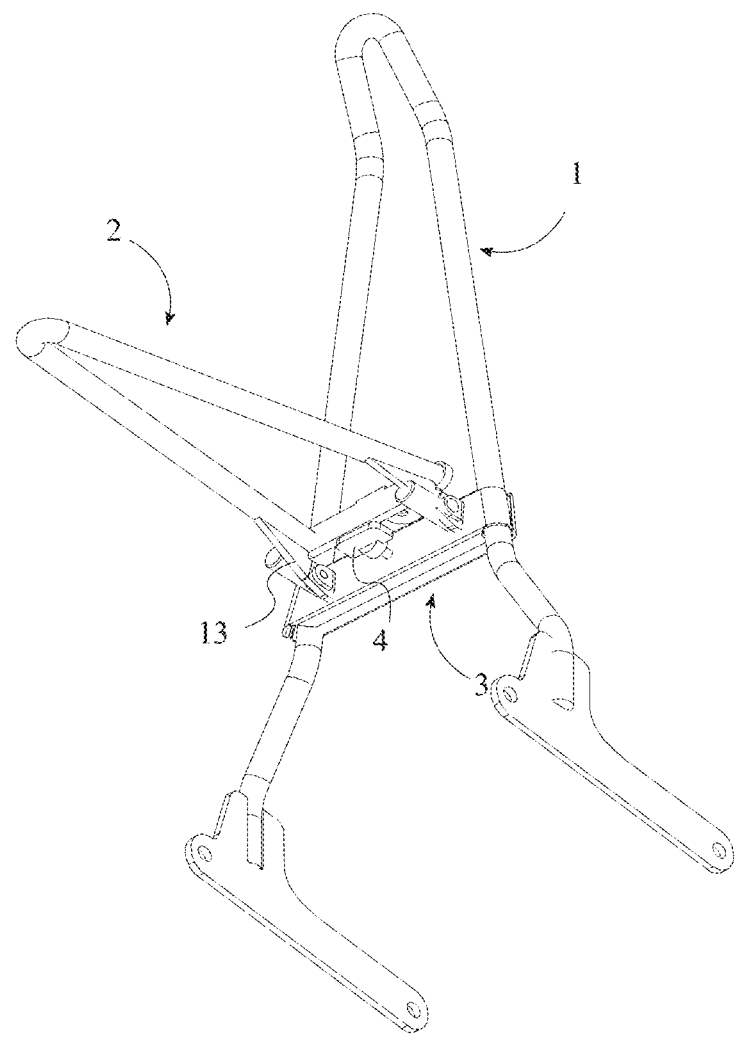
FIG. 10 is a bottom-rear-right perspective view of the present invention.

Thus, in reference to FIG. 9 through FIG. 11, or during the deployed configuration, the luggage frame 7 is angularly offset from the main frame 5, the locking knob 4 is in an unlocked position and the locking knob 4 is disconnected from the base piece 8. Further, during the deployed configuration, the luggage frame 7 is mounted normally to the main frame 5.

Alternatively, in reference to FIG. 1 through FIG. 8, or during the retracted configuration, the luggage frame 7 is positioned within the main frame 5, the locking knob 4 is in a locked position and the locking knob 4 is threaded through the luggage rack 2. As seen in FIG. 1 through FIG. 3, the main frame 5 is taller than the luggage frame 7. This is so that the luggage frame 7 sits flush within the main frame 5 when the luggage rack 2 is not being used. Further, the first end 5a of the main frame 5 is angularly offset with respect to the second end 5b of the main frame 5. In other words, the top end of the main frame 5 a has a slight bend. This is given to differentiate the main frame 5 from the luggage frame 7, as well as for aesthetic appeal.

Although the invention has been explained in relation to its preferred embodiment, it is to be understood that many other possible modifications and variations can be made without departing from the spirit and scope of the invention as hereinafter claimed.

What is claimed is:

1. A motorcycle sissy bar device comprising:
a sissy bar;
a luggage rack;
a base rack;
a locking knob;
the sissy bar comprising a main frame and an anti-slip support;
the luggage rack comprising a luggage frame, and a base piece;
the main frame comprising a first end and a second end, wherein the first end is positioned opposite to the second end across the main frame;
the anti-slip support being mounted within the main frame adjacent to the second end;
the luggage rack being mounted within the sissy bar;
the luggage rack being hingedly coupled to the sissy bar;
the base rack being mounted around the main frame, encapsulating the anti-slip support;
the base rack being positioned adjacent to the second end of the main frame;
the main frame tapering as it extends from the second end towards the first end;
the base piece being mounted onto the base rack;
the locking knob being centrally mounted about the base rack; and the locking knob being operably integrated between the base rack and the luggage rack, wherein operating the locking knob governs switching of the luggage rack between a deployed configuration and a retracted configuration.

2. The sissy bar device of claim 1 comprising:

the base piece comprising a locking port; and the locking knob being operably coupled with the locking port, wherein positioning of the locking knob within the locking port governs locked and unlocked positions of the luggage rack.

3. The sissy bar device of claim 1 further comprising:

the sissy bar comprising a plurality of mounting brackets; and the plurality of mounting brackets extending from terminal ends of the main frame.

4. The sissy bar device of claim 1 further comprising:

a plurality of apertures;

a plurality of fasteners;

the plurality of apertures traversing through the sissy bar and the base rack; and the plurality of fasteners being integrated within the plurality of apertures.

5. The sissy bar device of claim 4, wherein the plurality of fasteners comprise nuts and bolts.

6. The sissy bar device of claim 1 further comprising:

the base rack comprising a first piece and a second piece the first piece being connected to the second piece about the anti-slip support and the main frame; and the first piece being oriented towards the second piece.

7. The sissy bar device of claim 1 further comprising:

a plurality of rack clamps;

the plurality of rack clamps being mounted onto terminal ends of the luggage frame; and the plurality of rack clamps being operably coupled to the base rack, wherein the plurality of rack clamps prevents movement of the luggage rack beyond an angle during the deployed configuration.

8. The sissy bar device of claim 7, wherein the plurality of rack clamps is hingedly coupled to the base rack.

9. The sissy bar device of claim 1, wherein during the deployed configuration:

the luggage frame is angularly offset from the main frame; and the locking knob is in an unlocked position and is disconnected from the base piece.

10. The sissy bar device of claim 9, wherein during the deployed configuration, the luggage frame is mounted normally to the main frame.

11. The sissy bar device of claim 1, wherein during the retracted configuration:

the luggage frame is positioned within the main frame; and the locking knob is in a locked position and is threaded through the luggage rack.

12. The sissy bar device of claim 1 further comprising:

a plurality of holes;

the plurality of holes traversing through the base piece; and the luggage frame being threaded through the plurality of holes.

13. The sissy bar device of claim 1, wherein the main frame is taller than the luggage frame.

14. The sissy bar device of claim 1, wherein the first end of the main frame is angularly offset with respect to the second end of the main frame.

15. A motorcycle sissy bar device comprising:

a sissy bar;

a luggage rack;

a base rack;

a locking knob;

the sissy bar comprising a main frame and an anti-slip support;

the luggage rack comprising a luggage frame, and a base piece;

the main frame comprising a first end and a second end, wherein the first end is positioned opposite to the second end across the main frame;

the base piece comprising a locking port;

the anti-slip support being mounted within the main frame adjacent to the second end;

the luggage rack being mounted within the sissy bar;

the luggage rack being hingedly coupled to the sissy bar;

the base rack being mounted around the main frame, encapsulating the anti-slip support;

the base rack being positioned adjacent to the second end of the main frame;

the main frame tapering as it extends from the second end towards the first end;

the main frame is taller than the luggage frame;

the base piece being mounted onto the base rack;

the locking knob being centrally mounted about the base rack;

the locking knob being operably coupled with the locking port, wherein positioning of the locking knob within the locking port governs locked and unlocked positions of the luggage rack; and the locking knob being operably integrated between the base rack and the luggage rack, wherein operating the locking knob governs switching of the luggage rack between a deployed configuration and a retracted configuration.

16. The sissy bar device of claim 15 further comprising:

the sissy bar comprising a plurality of mounting brackets; and the plurality of mounting brackets extending from terminal ends of the main frame.

17. The sissy bar device of claim 15 further comprising:

a plurality of apertures;

a plurality of fasteners;

the plurality of apertures traversing through the sissy bar and the base rack; and the plurality of fasteners being integrated within the plurality of apertures.

18. The sissy bar device of claim 15 further comprising:

a plurality of rack clamps;

the plurality of rack clamps being mounted onto terminal ends of the luggage frame; and the plurality of rack clamps being operably coupled to the base rack, wherein the plurality of rack clamps prevents movement of the luggage rack beyond an angle during the deployed configuration.

19. The sissy bar device of claim 15 further comprising:

a plurality of holes;

the plurality of holes traversing through the base piece; and the luggage frame being threaded through the plurality of holes.

20. The sissy bar device of claim 15, wherein the first end of the main frame is angularly offset with respect to the second end of the main frame.

* * * * *